(12) United States Patent
Woithe et al.

(10) Patent No.: US 9,866,882 B1
(45) Date of Patent: Jan. 9, 2018

(54) VIDEO-BASED MEASUREMENT OF ROUND-TRIP LATENCY FROM USER INPUT EVENT TO CORRESPONDING VIDEO OUTPUT

(71) Applicant: Alcatel-Lucent USA Inc., Murray Hill, NJ (US)

(72) Inventors: Hans C. Woithe, Raritan, NJ (US); Martin D. Carroll, Watchung, NJ (US); Ilija Hadzic, Millington, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 15/389,716

(22) Filed: Dec. 23, 2016

(51) Int. Cl.
| | |
|---|---|
| H04N 21/60 | (2011.01) |
| H04N 21/63 | (2011.01) |
| H04N 21/647 | (2011.01) |
| H04N 21/24 | (2011.01) |
| H04N 21/422 | (2011.01) |
| H04N 21/442 | (2011.01) |
| H04N 21/433 | (2011.01) |
| H04N 21/437 | (2011.01) |

(Continued)

(52) U.S. Cl.
CPC ....... H04N 21/2408 (2013.01); H04N 21/239 (2013.01); H04N 21/2353 (2013.01); H04N 21/42204 (2013.01); H04N 21/433 (2013.01); H04N 21/437 (2013.01); H04N 21/44222 (2013.01)

(58) Field of Classification Search
CPC .... H04N 21/60; H04N 21/63; H04N 21/6332; H04N 21/637; H04N 21/647; H04N 21/64723; H04N 21/654; H04N 21/658; H04N 21/8358

USPC ......................................... 725/107, 113, 120
See application file for complete search history.

(56) References Cited

U.S. PATENT DOCUMENTS

| | | | |
|---|---|---|---|
| 5,775,996 A * | 7/1998 | Othmer | A63F 13/12 463/40 |
| 5,930,252 A * | 7/1999 | Aaker | H04Q 11/0478 370/395.2 |

(Continued)

OTHER PUBLICATIONS

I. Hadžić et al., "A Simple Desktop Compression and Streaming System," IEEE International Symposium on Multimedia (ISM), Dec. 9-11, 2013, pp. 339-346.

*Primary Examiner* — Dominic D Saltarelli
(74) *Attorney, Agent, or Firm* — Ryan, Mason & Lewis, LLP

(57) ABSTRACT

An apparatus in one embodiment comprises a client device configured to communicate with a remote system over a network. The client device comprises a processor, a memory, an input device and a display. The client device is configured to detect an input event generated at the input device, to store in the memory a local time associated with the input event, and to transmit information characterizing the input event to the remote system over the network. The client device is configured to receive from the remote system a video signal comprising an event index of the input event. An event index is extracted from the video signal, and a round-trip latency is computed between the input event and a corresponding video output of the client device based at least in part on a local time associated with the extracted event index and the stored local time associated with the input event.

21 Claims, 5 Drawing Sheets

(51) Int. Cl.
*H04N 21/239* (2011.01)
*H04N 21/235* (2011.01)

(56) References Cited

U.S. PATENT DOCUMENTS

| | | | |
|---|---|---|---|
| 2007/0260703 A1* | 11/2007 | Ardhanari | G06F 17/30395 |
| | | | 709/217 |
| 2011/0018959 A1 | 1/2011 | Friel et al. | |
| 2013/0155245 A1* | 6/2013 | Slamka | G09B 5/14 |
| | | | 348/158 |
| 2014/0078911 A1* | 3/2014 | Prescott | H04L 69/16 |
| | | | 370/252 |
| 2014/0085459 A1 | 3/2014 | Blanton et al. | |
| 2014/0152584 A1 | 6/2014 | Matthews et al. | |
| 2014/0267561 A1* | 9/2014 | Ahuja | H04N 7/15 |
| | | | 348/14.08 |
| 2014/0337473 A1* | 11/2014 | Frusina | H04L 5/003 |
| | | | 709/217 |
| 2015/0317926 A1 | 11/2015 | Leeman et al. | |
| 2016/0147363 A1 | 5/2016 | Seto | |

\* cited by examiner

VIDEO-BASED MEASUREMENT OF ROUND-TRIP LATENCY FROM USER INPUT EVENT TO CORRESPONDING VIDEO OUTPUT

FIELD

The field relates generally to information processing systems, and more particular to techniques for latency measurement in such systems.

BACKGROUND

Latency measurement is important in a wide variety of applications, including by way of example delivery of streaming video over networks. Conventional latency measurement techniques suffer from a number of significant drawbacks. For example, in many cases such latency measurement techniques are highly integrated with a particular specialized system for which latency is being measured and are not readily applicable to any other type of system. Moreover, conventional latency measurement techniques for video streaming and other similar applications often rely on the use of an external camera to monitor a video output of a display. Such techniques can unduly increase the cost and complexity associated with obtaining the latency measurement.

SUMMARY

Illustrative embodiments provide techniques for video-based measurement of round-trip latency from a user input event detected in a client device to a corresponding video output of that client device.

In one embodiment, an apparatus comprises a client device configured to communicate with a remote system over a network. The client device comprises a processor, a memory coupled to the processor, an input device coupled to the processor, and a display coupled to the processor and configured to present video output. The client device is configured to detect an input event generated at the input device, to store in the memory a local time associated with the input event, and to transmit information characterizing the input event to the remote system over the network.

By way of example, the client device in some embodiments may be configured to receive from the remote system a video signal comprising an event index of the input event, to extract the event index from the video signal, and to compute a round-trip latency between the input event and a corresponding video output of the client device based at least in part on a local time associated with the extracted event index and the stored local time associated with the input event.

Alternatively, the client device in other embodiments may be configured to store one or more video frames of the video signal with respective corresponding local times in at least one file for subsequent offline processing by another device that extracts the event index and computes the round-trip latency.

In another embodiment, an apparatus comprises a remote system configured to communicate with a client device over a network. The remote system comprises one or more processing devices each comprising a processor coupled to a memory. The remote system is configured to receive from the client device over the network information characterizing an input event detected in the client device and for which the client device stores in a memory thereof a local time associated with the input event, to generate an event index based at least in part on the received information, to insert the event index into a video signal, and to transmit the video signal comprising the inserted event index to the client device over the network. The event index when extracted from the video signal is utilized to compute a round-trip latency between the input event and a corresponding video output of the client device based at least in part on a local time associated with the extracted event index and the stored local time associated with the input event.

The extraction of the event index and the computation of the round-trip latency may be performed in some embodiments by the client device. Alternatively, such operations can be performed in an offline mode by another processing device that receives from the client device one or more files containing one or more video frames of the video signal with respective corresponding local times.

Other illustrative embodiments include, without limitation, methods, systems and computer program products comprising processor-readable storage media.

DETAILED DESCRIPTION

Illustrative embodiments will be described herein with reference to exemplary information processing systems and associated devices and processes. It should be understood, however, that embodiments are not limited to the particular system, device and process arrangements described, but are instead more generally applicable to any of a wide variety of different types of information processing arrangements in which it is desirable to provide improvements in latency measurement.

Figure 1:
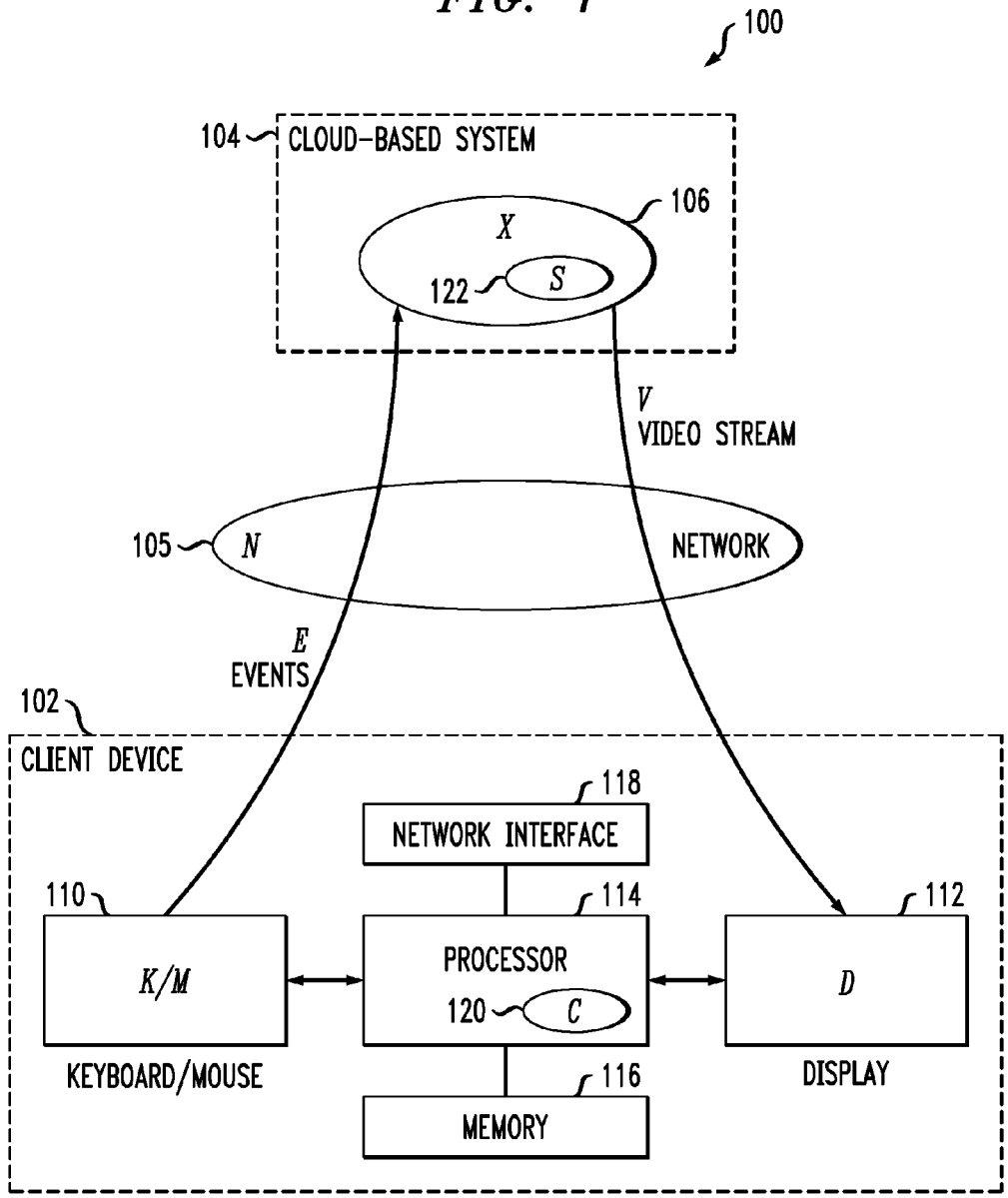
FIG. 1 shows an information processing system in which functionality for video-based measurement of round-trip latency from a user input event to a corresponding video output is implemented in an illustrative embodiment.

FIG. 1 shows an information processing system 100 configured with functionality for video-based measurement of round-trip latency in an illustrative embodiment. The system 100 comprises a client device 102 that communicates with a cloud-based system 104 over a network 105. The cloud-based system 104 is an example of what is more generally referred to herein as a "remote system." The term "remote system" as used herein is intended to be broadly construed so as to encompass any type of system that may be accessed by a client device over a network. It is therefore to be appreciated that the word "remote" does not require any type of geographic isolation relative to the client device.

The cloud-based system 104 comprises at least one component illustratively comprising a video server 106. The video server 106 is also denoted as component X in the figure. Numerous other remote systems and associated components may be used in other embodiments.

The client device 102 comprises a keyboard/mouse 110 and a display 112 each coupled to a processor 114. Also coupled to the processor 114 is a memory 116 and a network interface 118. The keyboard/mouse 110 may comprise a keyboard, a mouse or both a keyboard and a mouse. Such components are examples of what are more generally referred to herein as "input devices" of the client device 102. The keyboard/mouse 110 and display 112 are also denoted as K/M and D in the figure. A wide variety of other types of input devices can be used in other embodiments. The term "coupled" as used herein is intended to encompass any type of direct or indirect interconnection supporting signal communications between the associated components.

In the FIG. 1 embodiments, video-based round-trip latency measurements are implemented utilizing a client program 120 illustratively running on the processor 114 and a server program 122 illustratively running on the video server 106 of the cloud-based system 104. The client program 120 and server program 122 are also respectively denoted as C and S in the figure.

The client device 102 may comprise a desktop computer, a laptop computer, a tablet computer, a mobile telephone or any other user device capable of communicating over the network 105 with the cloud-based system 104. A video stream denoted V in the figure is received by the client device 102 from the cloud-based system 104 and processed by the client device 102 for presentation on the display 112.

The cloud-based system 104 illustratively comprises a data center or other type of remote system that provides video and other information to the client device 102 over the network 105.

The network 105 can include a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The processor 114 may be implemented as a microprocessor, a microcontroller, an application-specific integrated circuit (ASIC), a field-programmable gate array (FPGA), or other type of processing circuitry, as well as portions or combinations of such processing circuitry. Such a processor may include one or more embedded memories as internal memories.

The processor 114 and any associated internal or external memory may be used in storage and execution of one or more software programs for controlling the operation of the corresponding client device 102. The client program 120 is an example of such a software program.

The memory 116 of the client device 102 is assumed to include one or more storage areas that are utilized for program code storage. The memory 116 may therefore be viewed as an example of what is more generally referred to herein as a processor-readable storage medium that has executable program code embodied therein. Articles of manufacture comprising such processor-readable storage media are considered illustrative embodiments. A wide variety of other types of computer program products comprising processor-readable storage media may also be used.

The memory 116 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices. Accordingly, other examples of processor-readable storage media as that term is broadly used herein may include disks or other types of magnetic or optical media, in any combination.

The video server 106, processor 114, memory 116, network interface 118 and other components of the client device 102 and cloud-based system 104 of information processing system 100 may include well-known circuitry suitably modified to implement at least a portion of the functionality for video-based measurement of round-trip latency described below. Conventional aspects of such circuitry are well known to those skilled in the art and therefore will not be described in detail herein.

In a given round-trip latency measurement process implemented in the FIG. 1 embodiment, the client program 120 executing on the processor 114 is configured to detect an input event generated at the keyboard/mouse 110, to store in the memory 116 a local time associated with the input event, and to transmit information characterizing the input event to the cloud-based system 104 over the network 105. For example, assuming that the input device comprises a keyboard, the input event may comprise a keystroke entered by a user at the keyboard. Similarly, if the input device comprises a mouse, the input event may comprise an actuation of the mouse. Numerous other types of input events generated by other input devices of the client device 102 can be similarly utilized in a round-trip latency measurement process in other embodiments.

The transmitted information characterizing the input event may be part of transmitted information characterizing multiple input events illustratively denoted as E in the figure. Accordingly, although some embodiments can perform a round-trip latency measurement process utilizing a single detected input event, other embodiments perform the process utilizing multiple detected input events.

The cloud-based system 104 receives from the client device 102 over the network 105 the transmitted information characterizing the input event detected in the client device 102. As noted above, this is a particular detected input event for which the client device 102 stores in its memory 116 a local time associated with the input event. The cloud-based system 104 responsive to receipt of the transmitted information characterizing the input event generates an event index based at least in part on the received information. The event index is inserted into a video signal generated by the video server 106, and the video signal comprising the inserted event index is transmitted by the cloud-based system 104 back to the client device 102 over the network 105.

Such operations are carried out at least in part utilizing the server program 122 of the video server 106. Although shown as being internal to the video server 106 in the present embodiment, the functionality associated with the server program 122 in other embodiments can be implemented at least in part externally to the video server 106. Also, the component X of the cloud-based system 104 in other embodiments need not comprise a video server but could instead comprise another type of component capable of inserting an event index identifying a particular input event into a video signal.

The event index in some embodiments is encoded within a code inserted into the video signal by the cloud-based system 104. For example, the code inserted into the video signal may comprise a two-dimensional barcode inserted into a particular designated subregion of pixels of a given video frame of the video signal. A more particular example of such a two-dimensional bar code is known as a quick response (QR) code. In some arrangements of this type, the code inserted into the video signal may be visible to a viewer of a video output generated from the video signal. Alternatively, the code inserted into the video signal may comprise a digital watermark or other similar code that is not visible to a viewer of a video output generated from the video signal.

Accordingly, it is apparent that a wide variety of different types of event indices that can identify a particular input event can be inserted into a video signal returned by the cloud-based system 104 to the client device 102 over the network 105. The video signal comprising the inserted event index illustratively comprises the video stream denoted V in the figure and generated by the video server 106.

The client device 102 receives from the cloud-based system 104 over the network 105 the video signal comprising the event index of the input event. The video signal is illustratively received via the network interface 118 of the client device 102. The client device 102 utilizes the client program 120 to extract the event index from the video signal, and to compute a round-trip latency between the input event and a corresponding video output of the client device based at least in part on a local time associated with the extracted event index and the stored local time associated with the input event.

In some embodiments, the "video output" for which the round-trip latency is measured comprises an output of a frame buffer or other related video processing component of the client device 102. For example, such a frame buffer or other related video processing component can be used to drive the display 112 for presentation of the video output to a user. However, it is to be appreciated that the term "video output" as used herein is intended to be more broadly construed so as to encompass video at any of a number of potential latency measurement points within the client device 102. The particular such measurement point utilized in a given embodiment may vary depending upon the specific measurement requirements of a given application. Accordingly, the "video output" may be an output of a particular component of the client device 102 that is utilized to process received video signals and to extract event indices from such signals.

The term "round-trip latency" as used herein is similarly intended to be broadly construed so as to encompass by way of example a latency from a first local time associated with detection of an input event such as a keystroke or mouse click in the client device 102 and a second local time associated with detection of the corresponding video output in the client device 102. The local times illustratively refer to respective timestamps or other time indicators generated in the client device 102. The local times can be in any of a wide variety of formats and need not correspond to an actual time of day at the particular location of the client device. Accordingly, the local times could be in an arbitrary time format maintained internally by the client device.

It should also be noted that the FIG. 1 embodiment does not require any particular assumption about the local time at the video server 106 of the cloud-based system 104. For example, the client device 102 does not need to know the local time at the video server 106 and does not need to be synchronized to that time. There is no dependency in this and similar embodiments between a given latency measurement and the particular local time at the video server 106.

As mentioned previously, multiple input events may be detected by the client program 120 in the FIG. 1 embodiment. For example, the client device 102 may be configured to detect multiple keystrokes or mouse clicks from the keyboard/mouse 110, to store in the memory 116 a plurality of local times associated with respective ones of the input events, and to transmit information characterizing the input events to the cloud-based system 104 over the network 105. The local times associated with respective ones of the input events are in some embodiments stored as respective entries in an event array of the memory 116. The client device 102 may be configured to clear the event array in conjunction with initiation of a given instance of a round-trip latency measurement process. Such functionality can be provided by the client program 120.

In an arrangement of this type, the cloud-based system 104 illustratively receives from the client device 102 over the network 105 information characterizing the plurality of input events detected in the client device. The cloud-based system 104 utilizing server program 122 of the video server 106 generates event indices for respective ones of the input events based at least in part on the received information, inserts one or more of the event indices into each of one or more frames of the video signal, and transmits the video signal comprising the inserted event indices to the client device 102 over the network 105.

The event indices in an embodiment of this type illustratively comprise respective values of an event count that is incremented by the cloud-based system 104 for each of the plurality of input events. The cloud-based system 104 via its server program 122 is configured to reset the event count in conjunction with initiation of a given instance of a round-trip latency measurement process in the system 100. In some implementations, the cloud-based system 104 illustratively inserts only a most recent one of the event count values into a particular one of the frames of the video signal.

Although some embodiments disclosed herein are configured to insert a single event index into a given video frame, other embodiments can insert multiple event indices into each of one or more video frames.

The client device 102 may be configured to store a plurality of received video frames of the video signal in a frame buffer, to detect at least a portion of a given one of the video frames that includes an inserted code, and to extract the event index from the inserted code of the given video frame. The client device 102 can then compute the round-trip latency between the input event and the corresponding video output of the client device 102 based at least in part on an arrival time of the given video frame and the stored local time associated with the input event. These and other operations of the client device 102 are illustratively carried out under the control of the client program 120.

In the FIG. 1 embodiment, the round-trip latency measured using client program 120 and server program 122 is illustratively a type of "finger-to-eyeball" latency measured from detection of a particular keystroke, mouse click or other input event to detection of a corresponding video output of the client device 102.

Such finger-to-eyeball latency measurements are important in many different applications. For example, in the case of a remote system implemented by a video streaming service such as Netflix, it is important to be able to accurately measure the round-trip latency between a user input event such as a start, pause or restart command entered at a client device for a given video and detection of corresponding video output at the client device for presentation to the user. The video streaming service would generally like this latency to be as low as possible, and therefore needs a way to measure it unobtrusively in a deployed running system.

Latency measurements of the type provided herein are also useful in remote-desktop systems that provide virtual network computers or types of remote desktops to users over a network. Again, the provider of a remote-desktop service would generally like the round-trip latency between a user input event and the corresponding video output at the client device to be as low as possible, and therefore needs to measure it unobtrusively in a deployed running system.

Illustrative embodiments disclosed herein meet these and other needs of implementers of remote systems that deliver video to client devices.

As mentioned above, various other types of round-trip latency can be measured in other embodiments. For example, it is possible to measure the latency with respect to a video output that corresponds to actual presentation of the video on the display 112. This can be done by capturing a local time more closely associated with actual presentation of the video output on the display 112 rather than a local time associated with capture of the corresponding video into a frame buffer. Those skilled in the art will appreciate that such alternative local times can be determined in a variety of different ways. For example, some displays have a known internal delay that can be utilized for this purpose. As another example, an external camera can be configured to capture the video output as it is presented on the display. Numerous other alternative latency measurement arrangements are possible using the techniques disclosed herein.

A round-trip latency measurement computed in the manner described above is utilized in some embodiments to adjust at least one operating parameter of at least one of the client device 102, the cloud-based system 104 and the network 105 in order to reduce the latency. The latency measurement can be repeated after any such adjustment in order to determine if the desired reduction has been achieved.

Advantageously, the FIG. 1 embodiment avoids the excessive cost and complexity that would otherwise be associated with use of external cameras in the round-trip latency measurement process.

Moreover, the client program 120 and the server program 122 in the FIG. 1 embodiment can be implemented in a manner that is substantially independent of the particular system being measured. Accordingly, these programs can be adapted in a straightforward manner for use in measuring round-trip latency in a wide variety of other systems, including systems in which internal hardware cannot be modified in any way.

Similar advantages are provided in other illustrative embodiments, such as one or more of the embodiments to be described below in conjunction with FIGS. 2 through 6.

It is to be appreciated that the particular arrangement of system components shown in FIG. 1 is exemplary only, and numerous alternative system and device configurations may be used in other embodiments. For example, the client device 102 and the cloud-based system 104 can be configured to incorporate additional or alternative components and to support a variety of different communication protocols.

Another illustrative embodiment will now be described with reference to FIG. 2. An information processing system 200 in this embodiment comprises client device 202, cloud-based system 204, network 205, keyboard/mouse 210 and display 212, which are assumed to be implemented in a manner similar to respective components 102, 104, 105, 110 and 112 as previously described.

In this embodiment, the client device 202 comprises a client program 220 that performs "snooping" on input events detected in the client device 202 and sent to the cloud-based system 204 and "scraping" of corresponding video received in the client device 202 from the cloud-based system 204. Such operations are illustratively implemented at least in part utilizing an operating system of the client device 202, although numerous alternative arrangements are possible.

The cloud-based system 204 includes a server program 222 that is illustratively shown as being external to a video server 206 but in other embodiments could be implemented at least in part internal to the video server 206.

The client program 220 in this embodiment snoops on the keystrokes or mouse clicks that are being entered by a user at the client device 202 and sent by the client device 202 to the video server 206 of the cloud-based system 204. Each time the client program 220 detects a keystroke or mouse click, it stores the local time of that event with an identifier of the event in an event array of a memory of the client device 202. The client device 202 clears the event array in conjunction with initiation of a given instance of a round-trip latency measurement process.

The server program 222 in this embodiment receives the detected input events from the client device 202. For each such event, the server program 222 increments an event count and generates a corresponding event index in the form of a QR code that it supplies to the video server 206 for insertion into the next available video frame of video stream V being sent to the client device 202 over the network 205. The QR codes supplied from the server program 222 to the video server 206 are also denoted Q in the figure. It should be noted that, although this particular embodiment illustratively utilizes QR codes, the system 200 can be adapted in a straightforward manner to use other types of two-dimensional bar codes or more generally other types of event indices.

If the server program 222 receives multiple input events during a time period for which QR codes for each such event could be generated and inserted into the same video frame, it will instead encode only the most recent of the multiple input events in a QR code and insert that single QR code into the video frame. Accordingly, the present embodiment assumes that only a single QR code encoding the most recently received input event is inserted into a given video frame of the video signal being transmitted to the client device 202. In other embodiments, other types of event indices, coding arrangements and insertion techniques can be used. The server program 222 is illustratively configured to reset the event count in conjunction with the initialization of a given instance of a round-trip latency measurement process.

The client program 220 scrapes the arriving video stream from the video server 206 and looks for QR codes in that video stream. Each time the client program 220 finds a new QR code in the video stream, it extracts the event count from that QR code. It then looks up the local time that is stored for the corresponding input event in the event array, which is illustratively indexed by the event count. The client program 220 computes the round-trip latency by calculating the time difference between the stored local time and the local arrival time of the incoming video frame that contained the QR code. This time difference is the round-trip latency of the corresponding input event. The arrival time may be a time at which the video frame was buffered in a frame buffer of the client device 202, although other types of arrival times may be used.

The above-described video scraping and associated round-trip latency computation can be done offline. For example, the client program 220 may be configured to store local times for all arriving video frames for later processing to determine round-trip latency when necessary.

In one example of an embodiment of this type, a given client device collects raw data comprising video frames and corresponding local timestamps in a file that is subsequently transferred to another computer or other processing device for further processing to obtain the latency measurements.

It is assumed that the above-noted file or another related file provided from the client device to the other processing device includes additional information used in the round-trip latency computation such as information characterizing the detected input events as well as their respective stored local times.

Accordingly, some embodiments perform the latency measurement computations on a different processing device than the client device that captures the video frames and the corresponding local timestamps.

Figure 2:
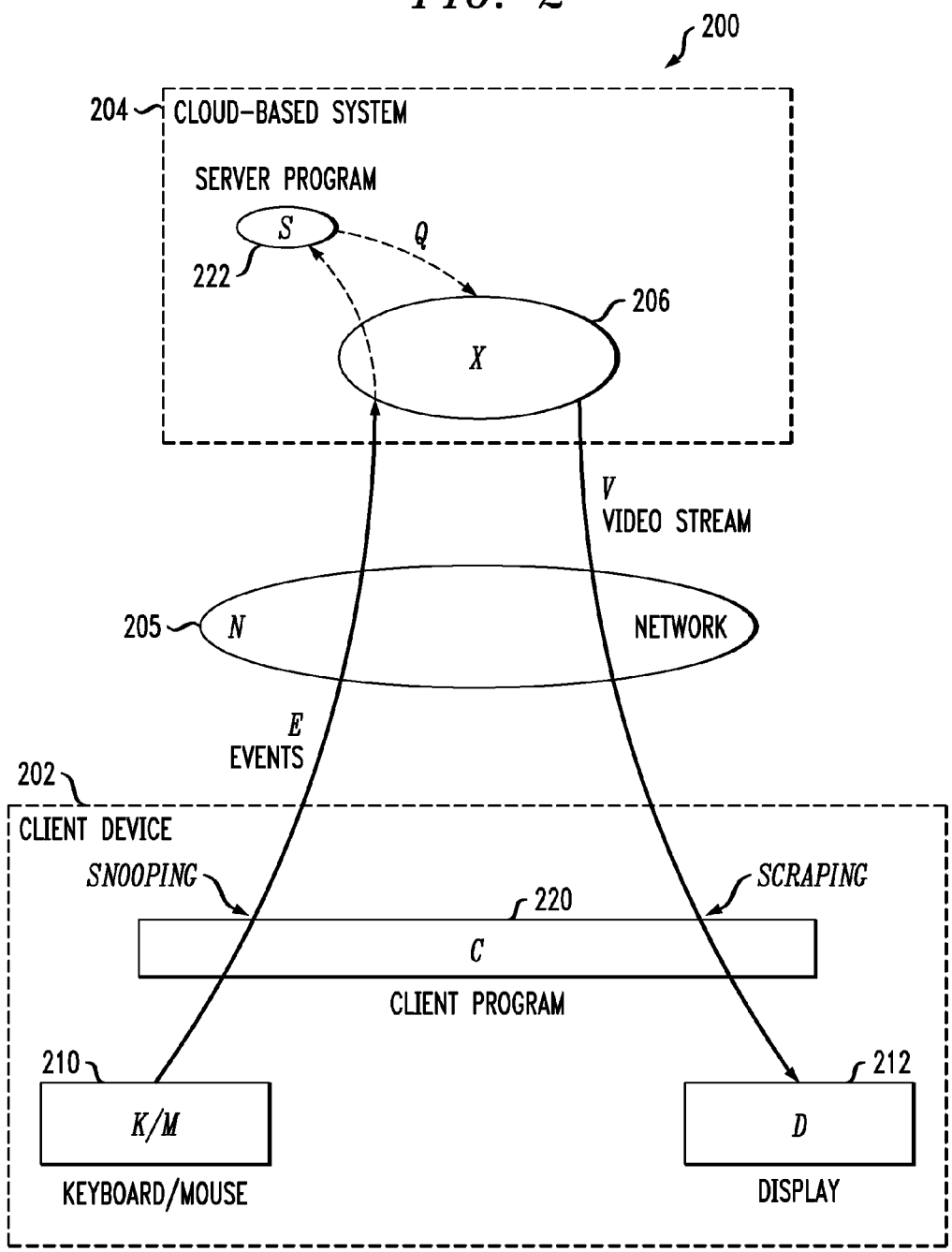
FIGS. 2 and 3 show respective additional examples of other information processing systems in which video-based round-trip latency measurement is implemented in illustrative embodiments.

The FIG. 2 embodiment utilizes QR codes that are assumed to be visible in the video output as presented on the display 212. As indicated previously, other types of codes can be used. These other codes may include digital watermarks that are not visible in the video output as presented on the display 212. In some arrangements of this type, a QR code or other type of two-dimensional bar code may be further encoded as a digital watermark so as to ensure that the QR code will not be visible when the video output is displayed to a user. Alternatively, a digital watermark encoding a given event count or other type of event index can be used as a replacement for a QR code.

The above-described techniques for video-based measurement of round-trip latency in the information processing system 200 can be implemented in numerous other systems of different types. For example, such techniques can generally be implemented in any information processing system in which it is possible to implement one or more programs on the client device that can snoop on keystrokes, mouse clicks or other input events to be delivered by the client device to a remote system and that can scrape the corresponding video that is received in the client device from the remote system, and in which it is possible to implement one or more programs on the remote system that can receive the input events and modify the video signal that is being sent back to the client device to include event indices for respective ones of the input events. Examples of such systems include video streaming systems such as Netflix as well as remote-desktop systems.

Figure 3:
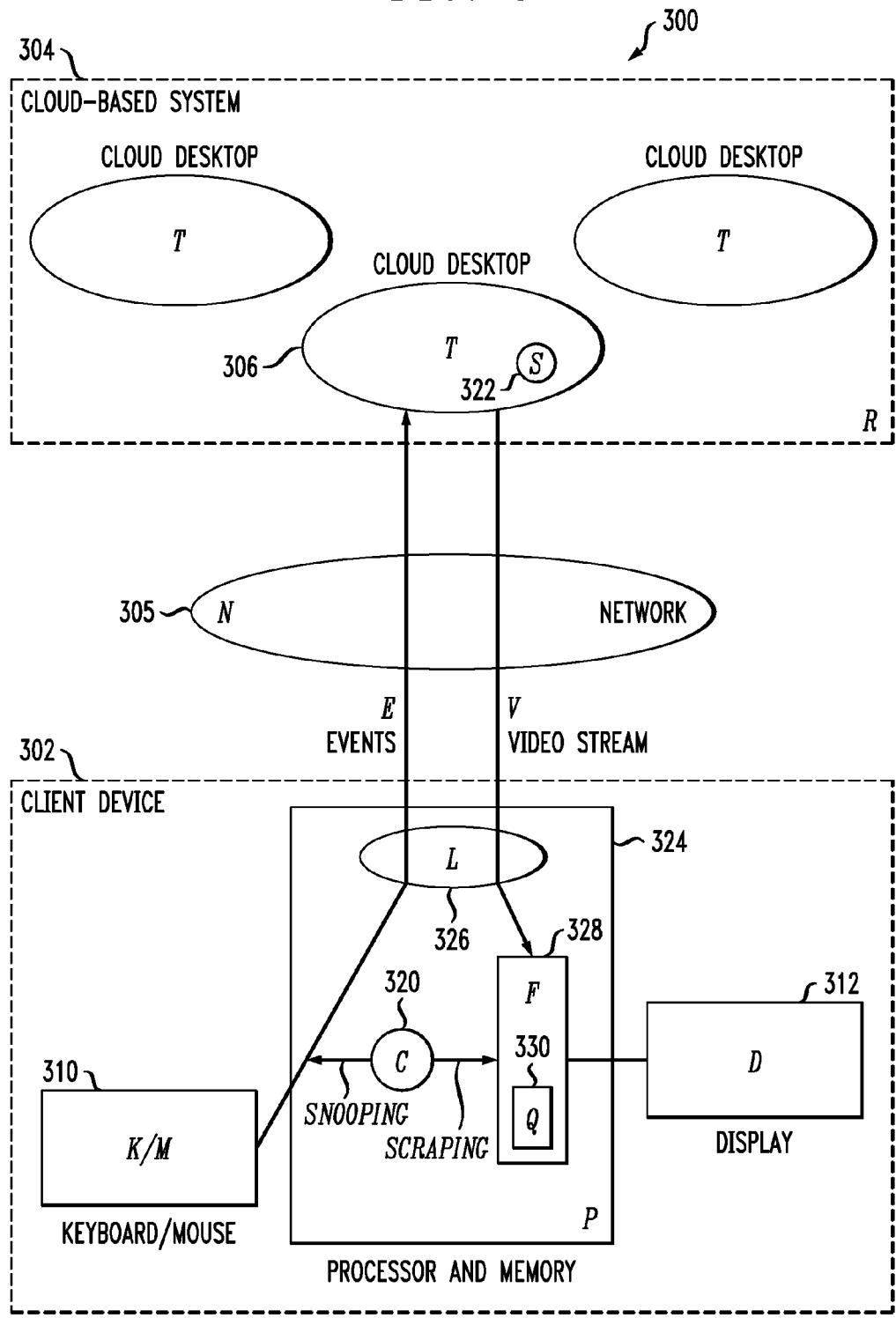

FIG. 3 shows an illustrative embodiment of an information processing system 300 in which the round-trip latency measurement is performed using video provided by a remote-desktop system. The information processing system 300 in this embodiment comprises client device 302, cloud-based system 304, network 305, keyboard/mouse 310 and display 312, which are again assumed to be implemented in a manner similar to respective components in the previously-described embodiments of FIGS. 1 and 2.

The client device 302 implements a client program 320. The cloud-based system 304 is assumed to comprise a plurality of servers collectively denoted in the figure as R. These servers are configured to run a plurality of cloud desktops each denoted T. A given one of the cloud desktops 306 implements a server program 322. The server program 322 receives information characterizing keystrokes, mouse clicks or other input events E entered into a window or other display screen of the cloud desktop as presented on the display 312 of the client device 302. The server program 322 inserts corresponding event indices encoded as QR codes into video frames of the video stream V that is delivered to the client device 302 over the network 305.

Also included in the client device 302 in this embodiment is a combined processor and memory 324 that implements the client program 320 and additional related components including an additional client program 326 and a frame buffer 328, both also denoted as L and F, respectively, in the figure. The additional client program 326 in this embodiment illustratively provides conventional client-side functionality of the remote desktop system. In other embodiments, the additional client program 326 is implemented as part of the client program 320.

The additional client program 326 as illustrated in the figure relays the detected input events E to the cloud-based system 304 and decodes the corresponding received video into video frames that are stored in the frame buffer 328. A given such video frame illustratively comprises a subregion 330 of pixels that contains a QR code corresponding to a particular input event. An event index is extracted from the QR code in the manner previously described and its arrival time and the stored local time of the corresponding input event are utilized to compute a round-trip latency.

Again, the particular components and other features of the embodiments of FIGS. 2 and 3 are illustrative only, and can be varied in other embodiments.

For example, as mentioned previously, some embodiments are configured to insert a single event index into a given video frame, while other embodiments can insert multiple event indices into each of one or more video frames.

Also, as indicated above, in some embodiments the client device collects raw data comprising video frames and corresponding local timestamps in a file that is subsequently transferred to another computer or other processing device for further processing to obtain the latency measurements. Thus, the latency measurement computations can be performed in an offline manner by a processing device other than the client device.

An example process for round-trip latency measurement will now be described with reference to FIGS. 4 and 5.

Figure 4:
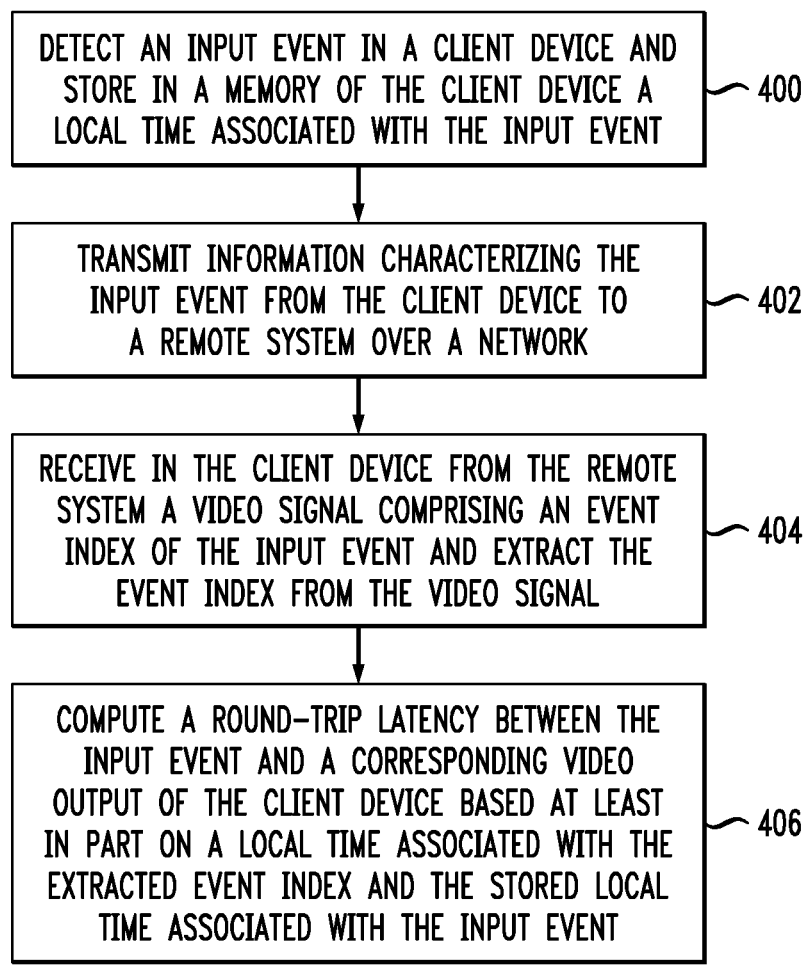
FIGS. 4 and 5 are flow diagrams of respective portions of an example process for video-based round-trip latency measurement performed by respective client device and remote system components in an illustrative embodiment.

FIG. 4 illustrates a portion of the example process that is performed by a client device such as client device 102, 202 or 302 of respective FIGS. 1, 2 and 3.

Figure 5:
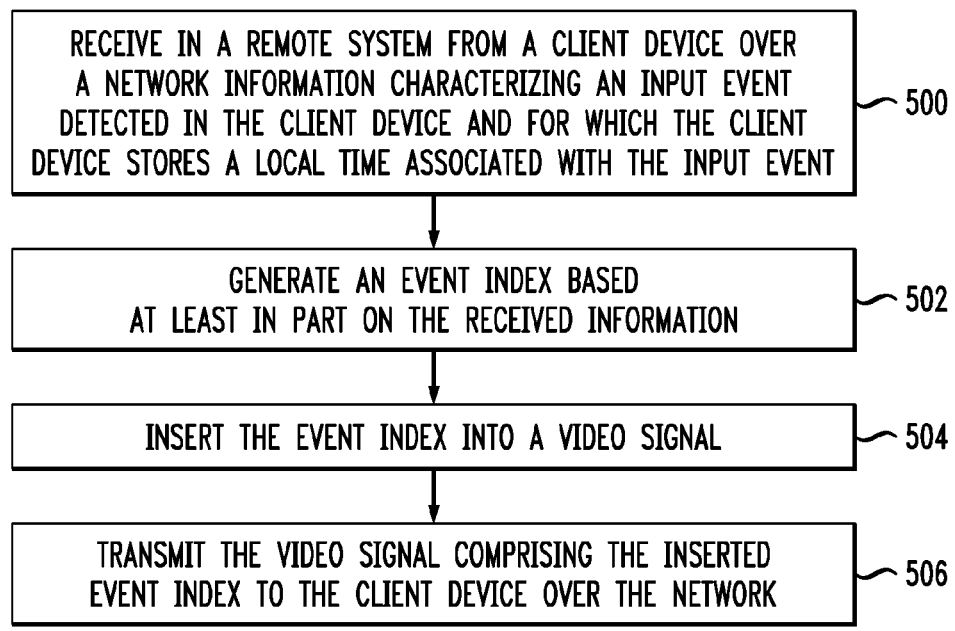

FIG. 5 illustrates a portion of the example process that is performed by a remote system such as cloud-based system 104, 204 or 304 of respective FIGS. 1, 2 and 3.

However, it is to be appreciated that the example process as illustrated can be performed by other types of client devices and remote systems in other embodiments.

Although only a single input event is referenced in conjunction with the example process of FIGS. 4 and 5, other embodiments can be configured to process multiple input events in the manner previously described. In such an arrangement, multiple latency measurements generating using respective ones of the input events can be averaged or otherwise processed in computing round-trip latency.

Referring initially to FIG. 4, the portion of the example process as shown includes steps 400 through 406.

In step 400, an input event is detected in a client device and a local time associated with the input event is stored in a memory of the client device. The local time illustratively denotes a timestamp generated by the client device.

In step 402, information characterizing the input event is transmitted from the client device to a remote system over a network. As mentioned above, examples of remote systems include cloud-based systems providing video streaming services such as Netflix or remote-desktop services.

In step 404, the client device receives from the remote system a video signal comprising an event index of the input event. The client device extracts the event index from the video signal. The event index identifies a particular one of the input events previously detected by the client device and transmitted over the network to the remote system. The client device utilizes the extracted event index to retrieve from its memory the stored local time associated with the particular input event.

In step 406, the client device computes a round-trip latency between the particular input event and a corresponding video output of the client device based at least in part on a local time associated with the extracted event index and the stored local time associated with the input event.

As indicated previously, a latency measurement computed in the manner described above is utilized in some embodiments to adjust at least one operating parameter of at least one of the client device, the remote system and the network in order to reduce the latency. The latency measurement can be repeated after any such adjustment in order to determine if the desired reduction has been achieved.

Again, the round-trip latency in other embodiments can be computed in an offline manner by a processing device other than the client device. For example, the client device can store video frames and associated local timestamps in a file that is subsequently provided to another device for further processing.

Referring now to FIG. 5, the portion of the example process as shown includes steps 500 through 506.

In step 500, the remote system receives from the client device over a network information characterizing an input event detected in the client device and for which the client device stores in its memory a local time associated with the input event. This receipt of information is responsive to the transmission of information in step 402 of the FIG. 4 portion of the process.

In step 502, the remote system generates an event index based at least in part on the received information. The event index in some embodiments comprises an event count but may comprise other types of information that can serve to identify a particular input event detected at the client device.

In step 504, the remote system inserts the event index into a video signal. For example, the event index may comprise an event count that is encoded into a QR code or other type of code that is inserted into a particular frame of the video signal.

In step 506, the remote system transmits the video signal comprising the inserted event index to the client device over the network. The transmitted video is received by the client device in step 404 of the FIG. 4 portion of the process.

The particular process steps and other operations described above in conjunction with the flow diagrams of FIGS. 4 and 5 are exemplary only, and additional or alternative process steps or operations may be used in other embodiments. For example, multiple instances of the process can be performed for different input events with the various results averaged as previously described to improve accuracy of the round-trip latency measurement. These and numerous other alternative arrangements of process steps and other operations are possible for implementing functionality for video-based measurement of round-trip latency in other embodiments.

Another illustrative embodiment will now be described with reference to the timing diagram of FIG. 6. In this embodiment, a client program denoted "client testapp" detects a particular input event E at a local time t=1. The client program transmits information characterizing the particular input event to a server of a remote system. The server receives the information characterizing input event E at time t=3. The server generates an event index and inserts it into a video frame of a video stream that is returned to the client device. The event index is extracted at the client device and the corresponding video output is provided to a client viewer running on the client device. The video output is associated with a time t=8 at the client device. This may be an arrival time of the decoded video frame in a frame buffer of the client device, or another local time associated with the video frame from which the event index was extracted. The round-trip latency is computed in this example as the difference between the stored local time t=1 of the input event and the local time t=8 of the corresponding video output from which the event index was extracted. Accordingly, the round-trip latency is illustratively given by 8−1=7.

Figure 6:
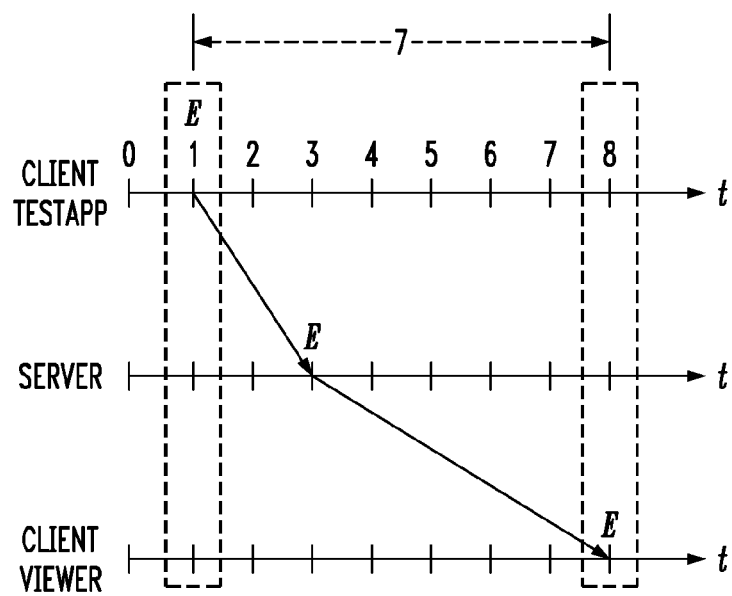
FIG. 6 is a timing diagram showing an example of video-based round-trip latency measurement in an illustrative embodiment.

As in other embodiments, the event index in the FIG. 6 embodiment may be encoded in a QR code, digital watermark or other type of code that is inserted into a given video frame. Other types of techniques can be used to convey event indices in association with video frames from the remote system to the client device for use in computing round-trip latency.

Although some illustrative embodiments disclosed herein advantageously eliminate the need for external cameras, other embodiments can utilize an external camera to extend the functionality of a given latency measurement system.

For example, one possible alternative embodiment can be configured to measure the unknown latency of a given display device rather that a round-trip latency involving a remote system. This alternative embodiment illustratively involves generating a sequence of QR codes for presentation on a first display device with known latency in a manner similar to that described above, while also mirroring that same sequence of QR codes for presentation on a second display device with unknown latency. An external camera is then utilized to determine the difference in display times between corresponding QR codes on the two different display devices. A cable or other similar arrangement can be used to mirror the sequence of QR codes from the first display device with known latency to the second display device with unknown latency. The display device with the higher latency will generally display any given one of the QR codes later in time than the other display device. The external camera can used to record video presented on the two display devices placed side-by-side. The recorded video is analyzed to determine the latency difference between the two display devices. This latency difference and the known latency of the first display device is used to compute the unknown latency of the second display device.

It was indicated above that embodiments of the present invention may be implemented in the form of articles of manufacture or other types of computer program products comprising processor-readable storage media each having embodied therein one or more software programs that are executed by one or more processing devices of an information processing system.

For example, a computer program product in one embodiment comprises a non-transitory processor-readable storage medium having embodied therein executable program code that when executed by at least one processor of a client device causes the client device to detect an input event, to store in a memory of the client device a local time associated with the input event, to transmit information characterizing the input event from the client device to a remote system over a network, and to receive in the client device from the remote system a video signal comprising an event index of the input event. The event index is extracted from the video signal, and a round-trip latency between the input event and a corresponding video output of the client device is computed based at least in part on a local time associated with the extracted event index and the stored local time associated with the input event.

As a further example, a computer program product in another embodiment comprises a non-transitory processor-readable storage medium having embodied therein executable program code that when executed by at least one processor of a remote system causes the remote system to receive from a client device over a network information characterizing an input event detected in the client device and for which the client device stores a local time associated with the input event, to generate an event index based at least in part on the received information, to insert the event index into a video signal, and to transmit the video signal comprising the inserted event index to the client device over the network. The event index when extracted from the video signal is utilized to compute a round-trip latency between the input event and a corresponding video output of the client device based at least in part on a local time associated with the extracted event index and the stored local time associated with the input event.

Numerous other computer program product embodiments can be configured using the techniques disclosed herein.

Also, embodiments of the present invention may be implemented in one or more ASICS, FPGAs or other types of integrated circuit devices, in any combination. Such integrated circuit devices, as well as portions or combinations thereof, are examples of "circuitry" as that term is used herein.

A wide variety of other arrangements of hardware and associated software or firmware may be used in implementing illustrative embodiments.

It should again be emphasized that the embodiments described above are for purposes of illustration only, and should not be interpreted as limiting in any way. Other embodiments may use different types of client device, remote system and network configurations, and alternative processing operations for implementing functionality for video-based measurement of round-trip latency in an information processing system. Also, it should be understood that the particular assumptions made in the context of describing the illustrative embodiments should not be construed as requirements or limitations. Other embodiments can be implemented in which these particular assumptions do not apply. These and numerous other alternative embodiments within the scope of the appended claims will be readily apparent to those skilled in the art.

What is claimed is:

1. An apparatus comprising:
a client device configured to communicate with a remote system over a network;
the client device comprising:
 a processor;
 a memory coupled to the processor;
 an input device coupled to the processor; and
 a display coupled to the processor and configured to present video output;
wherein the client device is further configured:
 to detect an input event generated at the input device;
 to store in the memory a local time associated with the input event;
 to transmit information characterizing the input event to the remote system over the network; and
 to receive from the remote system a video signal comprising an event index of the input event;
wherein the event index is extracted from the video signal; and
wherein a round-trip latency is computed between the input event and a corresponding video output of the client device based at least in part on a local time associated with the extracted event index and the stored local time associated with the input event.

2. The apparatus of claim 1 wherein the input device comprises one of a keyboard and a mouse and wherein the input event comprises one of a keystroke entered at the keyboard and an actuation of the mouse.

3. The apparatus of claim 1 wherein the client device is further configured to store one or more video frames of the video signal with respective corresponding local times in at least one file for subsequent offline processing by another device that extracts the event index and computes the round-trip latency.

4. The apparatus of claim 1 wherein the event index is encoded within a code inserted into the video signal by the remote system.

5. The apparatus of claim 4 wherein the code inserted into the video signal comprises a two-dimensional barcode.

6. The apparatus of claim 4 wherein the code is inserted into the video signal as a digital watermark.

7. The apparatus of claim 1 wherein the client device is further configured:
to detect a plurality of input events at the input device;
to store in the memory a plurality of local times associated with respective ones of the input events; and
to transmit information characterizing the input events to the remote system over the network.

8. The apparatus of claim 7 wherein the local times associated with respective ones of the input events are stored as respective entries in an event array of the memory.

9. The apparatus of claim 8 wherein the client device is further configured to clear the event array in conjunction with initiation of a given instance of a round-trip latency measurement process.

10. The apparatus of claim 1 wherein the client device is further configured:
to store a plurality of received video frames of the video signal in a frame buffer;
to detect at least a portion of a given one of the video frames that includes an inserted code; and
to extract the event index from the inserted code of the given video frame.

11. The apparatus of claim 10 wherein the client device is further configured to compute the round-trip latency between the input event and the corresponding video output of the client device based at least in part on an arrival time of the given video frame and the stored local time associated with the input event.

12. A method comprising:
detecting an input event in a client device;
storing in a memory of the client device a local time associated with the input event;
transmitting information characterizing the input event from the client device to a remote system over a network; and
receiving in the client device from the remote system a video signal comprising an event index of the input event;

wherein the event index is extracted from the video signal;

wherein a round-trip latency between the input event and a corresponding video output of the client device is computed based at least in part on a local time associated with the extracted event index and the stored local time associated with the input event; and wherein the detecting, storing, transmitting and receiving are performed by at least one processor of the client device.

13. A computer program product comprising a non-transitory processor-readable storage medium having embodied therein executable program code that when executed by said at least one processor of the client device causes the client device to perform the method of claim 12.

14. An apparatus comprising:

a remote system configured to communicate with a client device over a network;

the remote system comprising one or more processing devices each comprising a processor coupled to a memory;

wherein the remote system is further configured:

to receive from the client device over the network information characterizing an input event detected in the client device and for which the client device stores in a memory thereof a local time associated with the input event;

to generate an event index based at least in part on the received information;

to insert the event index into a video signal; and to transmit the video signal comprising the inserted event index to the client device over the network;

wherein the event index when extracted from the video signal is utilized to compute a round-trip latency between the input event and a corresponding video output of the client device based at least in part on a local time associated with the extracted event index and the stored local time associated with the input event.

15. The apparatus of claim 14 wherein the remote system comprises a cloud-based system having at least one video server configured to generate the video signal.

16. The apparatus of claim 14 wherein the event index is encoded within a code inserted into the video signal by the remote system.

17. The apparatus of claim 14 wherein the event index is inserted into a particular designated subregion of pixels of a given video frame of the video signal.

18. The apparatus of claim 14 wherein the remote system is further configured:

to receive from the client device over the network information characterizing a plurality of input events detected in the client device;

to generate event indices for respective ones of the input events based at least in part on the received information;

to insert one or more of the event indices into each of one or more frames of the video signal; and to transmit the video signal comprising the inserted event indices to the client device over the network;

wherein the event indices comprise respective values of an event count that is incremented for each of the plurality of input events; and wherein the remote system is further configured to reset the event count in conjunction with initiation of a given instance of a round-trip latency measurement process.

19. The apparatus of claim 18 wherein the remote system is further configured to insert only a most recent one of the event count values into a particular one of the frames of the video signal.

20. A method comprising:

receiving in a remote system from a client device over a network information characterizing an input event detected in the client device and for which the client device stores a local time associated with the input event;

generating an event index based at least in part on the received information;

inserting the event index into a video signal; and transmitting the video signal comprising the inserted event index to the client device over the network;

wherein the event index when extracted from the video signal is utilized to compute a round-trip latency between the input event and a corresponding video output of the client device based at least in part on a local time associated with the extracted event index and the stored local time associated with the input event; and wherein the receiving, generating, inserting and transmitting are performed by at least one processor of the remote system.

21. A computer program product comprising a non-transitory processor-readable storage medium having embodied therein executable program code that when executed by said at least one processor of the remote system causes the remote system to perform the method of claim 20.

* * * * *